United States Patent [19]

Hermann et al.

[11] Patent Number: 4,499,236

[45] Date of Patent: Feb. 12, 1985

[54] FINELY DIVIDED POLYVINYL ACETALS, A PROCESS FOR THEIR PREPARATION, AND THEIR USE IN BAKED COATINGS

[75] Inventors: Hans D. Hermann, Bad Soden am Taunus; Ulrich M. Hutten, Kelkheim, both of Fed. Rep. of Germany

[73] Assignee: Hoechst Aktiengesellschaft, Frankfurt am Main, Fed. Rep. of Germany

[21] Appl. No.: 562,218

[22] Filed: Dec. 16, 1983

[30] Foreign Application Priority Data

Dec. 16, 1982 [DE] Fed. Rep. of Germany ....... 3246605

[51] Int. Cl.$^3$ .............................................. C08F 8/28
[52] U.S. Cl. ...................................... 525/58; 525/61; 525/63; 525/69
[58] Field of Search ........................ 525/58, 61, 63, 69

[56] References Cited

U.S. PATENT DOCUMENTS

| | | | |
|---|---|---|---|
| 2,269,217 | 1/1942 | McNally et al. | 525/61 |
| 4,205,146 | 5/1980 | Hermann et al. | 525/61 |
| 4,369,281 | 1/1983 | Zimmermann et al. | 525/58 |

*Primary Examiner*—Paul R. Michl
*Assistant Examiner*—A. H. Walker
*Attorney, Agent, or Firm*—Berman, Aisenberg & Platt

[57] ABSTRACT

The invention relates to finely divided polyvinyl acetal which is prepared in the form of an aqueous suspension or, if desired, in powder form, preferably having average particle sizes from 0.5 to 10 μm, from polyvinyl alcohol and at least one aliphatic aldehyde having at least 3 carbon atoms, and which contains 0.1 to 10% by weight, based on polyvinyl acetal, of a completely or partially hydrolyzed vinyl ester copolymer grafted onto polyethylene oxide or polyethylene oxide derivatives and acetalized in the mixture with the polyvinyl alcohol.

The invention further relates to a process for preparing finely divided polyvinyl acetals having an average particle size between 0.5 and 10 μm in an aqueous suspension or, if desired, by dewatering the suspension, in powder form, by reacting an aqueous solution of polyvinyl alcohol, in the presence of an acidic catalyst and in the absence or presence of emulsifiers, with at least one aliphatic aldehyde having at least 3 carbon atoms, which comprises performing the acetalization reaction in the presence of 0.1 to 10% by weight, based on the polyvinyl alcohol used, of a completely or partially hydrolyzed graft copolymer of vinyl ester on polyethylene oxide or polyethylene oxide derivatives.

A further part of the subject-matter of the invention is the use of the finely divided polyvinyl acetals described above, in particular from a low-electrolyte or electrolyte-free aqueous suspension, preferably having an average particle size between 0.5 and 10 μm, for baked coatings on any coatable substrates, in particular on metals.

20 Claims, No Drawings

FINELY DIVIDED POLYVINYL ACETALS, A PROCESS FOR THEIR PREPARATION, AND THEIR USE IN BAKED COATINGS

The invention relates to the preparation of finely-divided polyvinyl acetals having an average particle size between 0.5 and 10 μm in a low-electrolyte aqueous suspension and, if desired in powder form, by dewatering the suspension, and to their use in baked coatings.

Pulverulent polymers are becoming increasingly important for coatings. Since they generally contain little solvent, if any, their application is environmentally very acceptable.

However, there are still various disadvantages to coating with dry polymer powder. In order for the powder to adhere, the substrate and, if necessary, the polymer have to be heated in the course of the coating step. In addition, it is difficult to obtain coatings having a smooth surface, since the polymer or resin particles should be relatively coarse. By comparison, coatings from an aqueous dispersion have been prepared for a long time. These aqueous dispersions usually contain polymers having a particle size of less than 0.5 μm. The polymers predominantly have a film-forming temperature of less than 20° C. Before they can be used to coat metal they have to be made—at considerable expense—low in electrolyte or largely free of electrolyte, for example by ultrafiltration (cf. German Offenlegungsschrift No. 2,817,231). If the glass transition temperature of the polymer is above 20° C., it is generally not possible to prepare crackfree coats which can be baked into crackfree surface coatings at elevated temperatures.

By comparison, aqueous polymer suspensions having particle sizes between about 0.5 μm and 20 μm behave more advantageously, in that, even if the glass transition temperature of the polymer is above 20° C., they dry, for example on metal substrates, into a crackfree layer which can be baked at elevated temperatures into a smooth coating. In order to obtain firm adhesion to the metal, the aqueous suspension should likewise be as free of electrolyte as possible.

However, these finely divided aqueous suspensions are exceedingly expensive to prepare.

One way of doing so is, for example, to mill the polymers or resins. However, this method has very high safety and energy requirements.

Another way is to use emulsion polymerization to prepare polymer suspensions having a particle size between 0.5 and 10 μm. However, this method requires a time-consuming and technically complicated polymerization technique (cf. German Offenlegungsschrift No. 2,416,446).

It has now been found, surprisingly, that, under certain conditions, the aqueous phase acetalization of polyvinyl alcohol with aliphatic aldehydes (which have at least 3 carbon atoms) can lead directly to polymer suspensions having the desired particle size, namely between 0.5 and 10 μm. The resulting aqueous suspensions are obtained right from the start with a relatively low electrolyte content. Moreover, they can be easily freed, completely or partially, from electrolytes and other water-soluble components by customary filtration techniques.

Accordingly, the present invention relates to a process for preparing finely divided polyvinyl acetals having an average particle size between 0.5 and 10 μm in an aqueous suspension (or, if desired in powder form, by dewatering the suspension) by reacting an aqueous solution of polyvinyl alcohol, in the presence of an acidic catalyst and in the absence or presence of emulsifiers, with at least one aliphatic aldehyde having at least 3 carbon atoms, which comprises performing the acetalization reaction in the presence of 0.1 to 10% by weight, based on the polyvinyl alcohol used, of a completely or partially hydrolyzed graft copolymer of vinyl ester, preferably vinyl acetate, on polyethylene oxide or polyethylene oxide derivatives.

The invention also relates to finely divided polyvinyl acetal which is prepared in the form of an aqueous suspension or, if desired, in powder form from polyvinyl alcohol and at least one aliphatic aldehyde having at least 3 carbon atoms, and which contains from 0.1 to 10% by weight, preferably 0.5 to 10% by weight, in particular 1 to 3% by weight, based on polyvinyl acetal, of a completely or partially hydrolyzed vinyl ester, in particular vinyl acetate, copolymer grafted onto polyethylene oxide or polyethylene oxide derivatives and acetalized in a mixture with the polyvinyl alcohol.

For the purposes of this invention, preferred finely divided polyvinyl acetals have average particle sizes between 0.5 and 10 μm.

The completely or partially hydrolyzed graft copolymers to be used according to the invention can be prepared by known methods, for example by polymerizing vinyl esters in the presence of polyethylene glycol, as described in German Pat. No. 1,077,430 or German Pat. No. 1,084,917, and subsequent hydrolysis or transesterification to the polyvinyl alcohol graft copolymer by the method of German Pat. No. 1,081,229.

The acetalization of the polyvinyl alcohol graft copolymers thus obtained is also known from German Pat. No. 1,086,435, the reaction products being aqueous dispersions having particle sizes of less than 0.5 μm or aqueous solutions. These products are, however, unsuitable for coating metal, because they are so highly water-sensitive.

It was therefore all the more surprising that completely or partially hydrolyzed graft copolymers of polyethylene glycol and vinyl esters, on addition to the reaction mixture in small amounts in the acetalization of ordinary polyvinyl alcohol, should have the desirable effect of reducing the particle size of the resulting polyvinyl acetal without impairing the water-resistance of the baked coatings prepared from the polyvinyl acetal obtained.

The completely or partially hydrolyzed graft copolymers used according to the invention preferably contain 1–50% by weight, in particular 5–40% by weight, of polyoxyethylene radicals, and the number of oxyethylene units bonded to one another can preferably be between 5 and 5,000, in particular 10 and 1,000. The remaining proportion in the graft copolymers preferably consists of 60–100% by weight vinyl alcohol units and preferably 0–40% by weight vinyl ester units, in particular vinyl acetate units, based on said residual proportion in the graft coolymers. In addition, up to 30% by weight, based on said residual proportion in the graft copolymers, of other monomer units, such as acrylate, vinyl chloride and/or ethylene units, can be incorporated in the graft copolymer molecule.

The molecular weight of the completely or partially hydrolyzed graft copolymers to be used according to the invention can vary within wide limits. However, relatively low molecular weight completely or partially hydrolyzed graft copolymers, for example those which have a DIN 53,015 viscosity between 2 and 20 mPa.s, preferably between 3 and 10 mPa.s, as measured at 20° C. on a 4% strength aqueous solution thereof, are preferable because of their better utilizability. Readily water-soluble completely or partially hydrolyzed graft copolymers are preferred.

According to the invention, the completely or partially hydrolyzed graft copolymer to be used in the acetalization of polyvinyl alcohol is added to the aqueous polyvinyl alcohol solution in the form of an aqueous solution before the reaction with aldehydes. The amount of completely or partially hydrolyzed graft copolymer added is preferably 0.1–10% by weight, in particular 0.5–5% by weight, based on the polyvinyl alcohol to be acetalized. It is particularly preferable to use 1–3% by weight of completely or partially hydrolyzed graft copolymer.

Any known partially or completely hydrolyzed polyvinyl alcohol is suitable, in principle, as the starting polyvinyl alcohol in the acetalization. However, it is preferable to use highly hydrolyzed, relatively low molecular weight polyvinyl alcohols. They should preferably have 0.5–3% by weight of vinyl acetate units, and their viscosity as measured in accordance with DIN 53,015 at 20° C. on a 4% strength aqueous solution should be between 2 and 20 mPa.s, preferably between 3 and 10 mPa.s.

The reaction with aldehydes takes place in a known manner in an aqueous solution in which the total concentration of polymers is preferably between 1 and 20% by weight or higher.

The reaction can be performed with any aliphatic aldehyde having at least 3 carbon atoms. Saturated aliphatic aldehydes having 3–20 carbon atoms, such as propionaldehyde, n-butyraldehyde, isobutyraldehyde, octanaldehyde or isononanaldehyde, are preferentially suitable for the reaction. n-Butyraldehyde is particularly preferred.

The aliphatic aldehydes with at least 3 carbon atoms (which are used in the process) can be introduced into the reaction as single compounds or in the form of a mixture with one another. They can even be replaced, to 50% by weight, based on the total amount of aldehydes used, by other aldehydes which react with polyvinyl alcohol to form an acetal, for example by aliphatic, cycloaliphatic or aromatic aldehydes, such as formaldehyde, acetaldehyde, hexahydrobenzaldehyde or benzaldehyde, or aldehydes having reactive groups, such as acrolein, crotonaldehyde, cinnamaldehyde, chloroacetaldehyde, chloral, aminoacetaldehyde, p-dimethylaminobenzaldehyde or glyoxylic acid. These aldehydes are preferably used in a proportion of up to 20% by weight of the entire aldehyde mixture, particularly preferably in a proportion of up to 10% by weight.

The acetalization reaction takes place in the presence of catalytically acting strong acids which are used in a customary concentration, for example between 0.1 and 10% by weight, preferably between 0.2 and 2% by weight, based on the aqueous phase. Since the acid contributes to the electrolyte content of the aqueous phase and, in some cases, can also coarsen the polymer particles, it is advisable to work at low acid concentrations which enable the reaction to be carried out at an industrially just acceptable rate. Suitable acids are in particular strong mineral acids, such as HCl, $H_2SO_4$, $HNO_3$, $HClO_4$, $H_3PO_4$ and others, and also aromatic and aliphatic sulfonic acids. One of said acids is preferably used together with an emulsifying long-chain aliphatic or alkylaromatic sulfonic acid which, in the case of excess acid being present, can also be used in the form of its salts. In a particularly preferred embodiment, a mixture of phosphoric acid and an aliphatic alkylsulfonic acid having 8–18 carbon atoms is used. The use of this catalyst mixture in a concentration between 0.4 and 1% by weight, based on the aqueous phase, permits the preparation of very uniform finely divided polyvinyl acetal which is virtually free of coarse polymer fractions. In this mixture, the ratio of phosphoric acid to sulfonic acid can preferably be between 5:1 and 1:2.

The acetalization reaction can be started in a customary manner by adding the aldehyde and/or the acid continuously or a little at a time to the initally introduced aqueous solution of the polyvinyl alcohol and of the completely or partially hydrolyzed graft copolymer. If relatively small amounts of acid are used, it is also possible to add all the components directly together. The reaction mixture must be stirred all the time, and it can be advantageous to stir vigorously as the acetalized polymer precipitates from the aqueous phase. The reaction can be carried out at the customary temperatures between 0° C. and the boiling point of the aldehyde or of water. However, the upper limit of the reaction temperature is determined by the glass transition point of the polyvinyl acetal polymer precipitating from the reaction mixture. This temperature must not be exceeded under any circumstances, since otherwise the polymer sinters together. In a preferred embodiment therefore, the acetalization starts at low temperatures, for example at 0°–20° C., and later the reaction mixture is heated to suitable elevated temperatures, for example to 30°–60° C., and the reaction is completed at these temperatures until the desired degree of acetalization has been reached.

The resulting polymer's degree of acetalization is determined by the ratio of aldehyde to polyvinyl alcohol, the duration of the reaction and the reaction temperature. The degree of acetalization can be within the customary range, for example between about 50 and 80 mole %, based on the polyvinyl alcohol. It is preferable to prepare polymers having a degree of acetalization of above 65 mole %. The simplest way of characterizing the product of the polymerization is to determine, by known methods, the proportion, in % by weight, of non-acetalized vinyl alcohol units in the acetalized polymer. This proportion should be between 9 and 25% by weight, preferably between 10 and 20% by weight.

Before and during the acetalization it can be advantageous to add various substances to the reaction mixture. These can primarily be phenolic antioxidants, optical stabilizers or other compounds known for stabilizing polyvinyl acetals. They can preferably be used in a concentration between 0.05 and 1% by weight, based on the precipitating acetalized polymer.

Furthermore, it is also possible, surprisingly, for pigments and fillers to be present during the acetalization, provided that these additives are inert in the reaction medium, i.e. that they neither dissolve nor react with the acid or with the aldehyde to any significant extent. Examples of suitable pigments are titanium dioxide and iron oxide. Examples of suitable fillers are talcum and silicon dioxide. In total they can be added in concentrations between 1 and 100% by weight, preferably between 10 and 50% by weight, based on the precipitating acetalized polymer.

It is furthermore advisable to add flow-control agents to the acetalization to assist film formation during the baking of the coating. Any liquid which can dissolve the polymer and is insoluble in water and preferably sparingly volatile is in principle a suitable flow-control agent. Examples of suitable liquids are the plasticizers and solvents which boil above 100° C. and are known for polyvinyl acetals, such as aromatic hydrocarbons, esters, alcohols and ethers, for example toluene, xylene, ethylglycol acetate, dihexyl adipate, trioctyl phosphate, triethylene glycol bis-2-ethylbutyric acid esters, and in particular compounds of the structure $R-(OCH_2CH_2)_nOH$, where R denotes a hydrophobic aliphatic or alkylaromatic radical having 8-30 carbon atoms or a polypropylene oxide radical, and n denotes an integer, preferably from 1 to 10, in particular from 1 to 4.

These compounds, which are referred to as flow-control agents, diffuse into the polymer particles and aid the flow of coatings during the baking. At the same time, however, they also lower the glass transition point of the polymer. Their most suitable concentration must therefore be determined from case to case according to the type of polymer and the course the acetalization reaction is to take. The most suitable concentration is generally between 1 and 10% by weight, based on the polyvinyl acetal.

Frequently it can also be advantageous to add emulsifying substances, in particular anionic and amphoteric emulsifiers. Amphoteric emulsifiers are available, inter alia, for example under the trade name, "Amphoseife" ("amphosoap"). These emulsifiers can additionally suppress the formation of coarse polymer particles and shift the average particle size toward small particles virtually without, surprisingly, increasing the water-sensitivity of the polyvinyl acetal films. Examples of suitable emulsifiers are alkanesulfonates, alkylphenylsulfonates, alkyl phosphonates and long-chain betaines. If used at all, the emulsifying compounds are preferably used in concentrations between 0.1 and 5% by weight, based on the polyvinyl alcohol used.

The polyvinyl acetal is obtained in the form of a strongly acidic aqueous suspension whose solids content is preferably between 5 and 25% by weight. This suspension can be converted into a storable low-electrolyte concentrate by customary methods, for example by decanting, centrifuging, filtering and washing and by neutralizing or alkalizing before, during or after these measures. The particular thoroughness of wash required depends on the level and, to some extent, also on the nature of the electrolyte content in the crude suspension.

It is advisable, for example, to pressure-filter through a fine paper or membrane filter, suspend the filter cake in water and filter again. Continuous filtration techniques are also very highly suitable. At the end of filtration the filter cake has water and alkalis, preferably amines, added to adjust the pH to 7-10. The moist filter cake can be easily resuspended in water by means of customary stirring systems. The resulting suspension is frequently still fluent at solids contents of up to 70% by weight.

The preferred solids content in the low-electrolyte or electrolyte-free aqueous polyvinyl acetal suspensions is 5 to 70% by weight, particularly preferably 25 to 60% by weight, in particular 40 to 60% by weight, based on the total aqueous low-electrolyte or electrolyte-free suspension which can, if desired, also contain flow-control agents and/or solvents and/or plasticizers and/or pigments and/or fillers.

It is also possible to filter off and dry the finely divided polyvinyl acetals, or to subject the suspension, which may have been washed until electrolyte free, to a spray-drying.

The polyvinyl acetal particles preferably have a size of 0.5 to 10 μm (=average mean particle diameter). They can be spherical, oval or rodlike and have a smooth surface.

The finely divided polyvinyl acetals are suitable for any use which is known for this type of polymer. They primarily serve as coatings on any coatable base or substrate, such as, for example, wood, glass, building materials, textiles or, preferably, metals. The aqueous polyvinyl acetal suspensions rapidly dry to form crack-free white layers which only sinter a little, if at all, and which can be washed off again with water. Baking at 90°-200° C. turns the layers into smooth, non-porous, firmly adherent and water-resistant coatings which can also have a corrosion protection action.

The following examples illustrate the invention in more detail without limiting it.

EXAMPLE 1

The starting material used was a polyvinyl alcohol which contained 2% by weight of vinyl acetate units and whose 4% strength aqueous solution had a viscosity at 20° C. of 9.1 mPa.s. 400 g of a 15% by weight strength solution of this polyvinyl alcohol were cooled down to 16° C., together with 34 g of n-butyraldehyde. A solution of 1 g of dodecylbenzenesulfonic acid, 0.4 g of hydrogen chloride and 1.2 g of a partially hydrolyzed graft copolymer in 144 ml of water was added at this temperature with stirring in the course of 20 minutes. The graft copolymer comprised 30% by weight of polyethylene glycol units having a molecular weight of 10,000, 13% by weight of vinyl acetate units and 57% by weight of vinyl alcohol units. Its 4% strength aqueous solution had a viscosity at 20° C. of 3.5 mPa.s.

After the end of the addition the reaction mixture was continuously stirred at 16° C. for a further 100 minutes, was then warmed to 45° C. in the course of 60 minutes, and was held at this temperature for 180 minutes. The result was a polyvinyl butyral suspension having particle sizes between 6 and 10 μm. The polyvinyl butyral contained 21.2% by weight of non-acetalized vinyl alcohol units.

EXAMPLE 2

The following were reacted analogously to the way described in Example 1:
400 g of a 15% strength aqueous solution of polyvinyl alcohol [viscosity (measured at 20° C. on 4% strength solution in H₂O): 11.5 mPa.s; vinyl acetate units content: 2.5% by weight]
44 g of n-butyraldehyde 2.4 g of pentadecylsulfonic acid
0.8 g of partially hydrolyzed graft copolymer as described in Example 1 } in 150 ml of water The result was a finely divided polyvinyl butyral having particle sizes from 0.5 to 5 μm and containing 15.6% by weight of non-acetalized vinyl alcohol units.

EXAMPLE 3

A 13% by weight strength solution in water was prepared from a polyvinyl alcohol which had a viscosity of 4.5 mPa.s, as measured at 20° C. on a 4% strength aqueous solution, and contained 3% by weight of vinyl acetate units. 2,300 g of this solution were cooled down to 12° C. together with 60 g of the 10% by weight strength aqueous solution of a partially hydrolyzed graft copolymer and 220 g of n-butyraldehyde. The partially hydrolyzed graft copolymer contained 25% by weight of polyethylene glycol units having a molecular weight of 20,000, 18% by weight of vinyl acetate units and 57% by weight of vinyl alcohol units. The batch was then admixed with 15 g of triethylene glycol monononylphenyl ether and a solution of 5 g of pentadecylsulfonic acid and 10 g of phosphoric acid in 400 ml of water. The mixture was stirred at 12° C. for 150 minutes, was heated to 40° C. in the course of 60 minutes and was held at this temperature for 180 minutes. The resulting suspension was largely freed from electrolyte by centrifuging and suspending twice, was concentrated to a 52% solids content and was brought to pH 9 by adding triethylamine. The polymer particles had sizes from 1 to 5 μm and contained 11% by weight of non-acetalized vinyl alcohol units.

Applied to glass in a wet film thickness of 150 μm, this suspension rapidly dried into a white layer which could be baked, at 120° C. in the course of 5 minutes, into a homogeneous film.

EXAMPLE 4

120 g of a 10% strength aqueous solution of the partially hydrolyzed graft copolymer of Example 3, 1 g of sodium polyphosphate, 30 g of isotridecyl monotriethylene glycol ether, 1,000 g of water and 225 g of titanium dioxide were dispersed, by vigorous stirring, in 4,160 g of a 14.4% strength aqueous solution of polyvinyl alcohol which had a viscosity of 4.7 mPa.s as measured at 20° C. on a 4% strength aqueous solution and contained 2.5% by weight of vinyl acetate units.

The mixture then had added to it 440 g of n-butyraldehyde in which 6 g of 2,6-di-tert.-butyl-p-cresol had been dissolved. The batch was cooled down to 10° C., and the acetalization was set going by adding 20 g of pentadecylsulfonic acid and 20 g of phosphoric acid in 180 g of water. The course of the temperature of the reaction was 10° C. for 150 minutes, 40° C. after heating for 60 minutes, and 40° C. for 180 minutes. When the reaction had ended, the resulting suspension was largely freed from electrolyte by filtering and suspending several times, was concentrated to a 48% by weight solids content and was brought to pH 9 by adding triethanolamine. The size of the polymer particles was in the range from 0.5 to 5 μm.

Applied to cleaned sheet steel in a wet film thickness of 100 μm, the polyvinyl butyral suspension thus obtained formed smooth and crackfree layers which could easily be washed off again with water. On baking at 150° C., these layers turned into white, crack-free and firmly adhering surface coatings.

EXAMPLE 5

A 15% by weight strength solution in water was prepared from the polyvinyl alcohol used in Example 2. 5 g of finely divided $SiO_2$ were stirred into 4,000 g of this solution. Thereafter the following were added in succession:

180 g of a 10% strength aqueous solution of a highly hydrolyzed graft copolymer comprising 30% by weight of polyethylene glycol units having a molecular weight of 2,000, 8% by weight of vinyl acetate units and 62% by weight of vinyl alcohol units 4 g of Amphoseife in 100 g of water 420 g of n-butyraldehyde 40 g of toluene and 40 g of isotridecyl monotriethylene glycol ether.

The acetalization reaction which took place in a 12-liter glass cylinder with a vane stirrer turning at 400 r.p.m. was set going by adding 10 g of octadecylsulfonic acid and 30 g of phosphoric acid in 1,200 g of water.

The temperature course of the reaction was the same as described in Example 4. The resulting suspension was likewise worked up and neutralized analogously to Example 4.

The suspension obtained had a solids content of 56% by weight, good flow properties and an average particle size of 3 μm.

The resulting polyvinyl butyral contained 13.1% by weight of non-acetalized vinyl alcohol units. It was possible to prepare smooth and crackfree coatings from the suspension.

EXAMPLE 6

A 14.6% by weight strength solution in water was prepared from the polyvinyl alcohol used in Example 4. 250 g of this solution were mixed with 60 g of a 10% by weight strength solution of a partially hydrolyzed graft copolymer comprising 25% by weight of polyethylene glycol units having a molecular weight of 20,000, 18% by weight of vinyl acetate units and 57% by weight of vinyl alcohol units. 376 g of isononanaldehyde and 15 g of isotridecyl monotriethylene glycol ether were then added, and the mixture was cooled down to 10° C. with vigorous stirring. The acetalization reaction was set going at this temperature by adding 15 g of pentadecylsulfonic acid and 10 g of phosphoric acid in 800 ml of water. The batch was initially stirred at 10° C. for 5 hours, was then heated to 40° C. in the course of an hour, and was held at this temperature for 2 hours.

The result was a finely divided suspension of polyvinyl isononanal having an average particle size of 2 μm and a solids content which could be filtered off on a finely porous glass suction filter to remove the water. The filter cake was used to prepare a concentrated suspension which, applied to a glass plate and baked, produced crack-free and well-sintered films.

EXAMPLE 7

2,375 g of an 8% by weight strength aqueous solution of the polyvinyl alcohol used in Example 2 were admixed with 45 g of a 10% by weight strength aqueous solution of the partially hydrolyzed graft copolymer used in Example 6. After addition of 139 g of n-butyraldehyde the mixture was cooled down to 10° C., and the batch was admixed with 5 ml of concentrated hydrochloric acid in 385 ml of water. The reaction mixture was stirred at 10° C. for 2½ hours, was heated to 40° C. in the course of an hour, and was held at 40° C. for 5 hours. The resulting polyvinyl butyral suspension comprised spherical particles whose diameter was between 0.5 and 5 μm.

The suspension was worked up as described in Example 4. Films prepared therefrom at room temperature were white, smooth and crack-free and could be washed off again with water. On baking at 180° C. they turned into clear, firmly adhering surface coatings.

We claim:

1. A process for preparing a finely divided polyvinyl acetal having an average particle size between 0.5 and 10 μm in an aqueous suspension or, if desired in powder form, by dewatering the suspension, by reacting an aqueous solution of polyvinyl alcohol, in the presence of an acidic catalyst and in the absence or presence of emulsifier, with at least one aliphatic aldehyde having at least 3 carbon atoms, which comprises acetalizing in the presence of 0.1 to 10% by weight, based on the polyvinyl alcohol used, of a completely or partially hydrolyzed graft copolymer of vinyl ester on polyethylene oxide or polyethylene oxide derivative.

2. The process as claimed in claim 1, wherein the starting material is a vinyl acetate graft copolymer.

3. The process as claimed in claim 1,
wherein the completely or partially hydrolyzed graft copolymer comprises 1 to 50% by weight of polyoxyethylene radicals, and the remaining proportion in the graft copolymer comprises 60 to 100% by weight of vinyl alcohol units and 0 to 40% by weight of vinyl ester units.

4. The process as claimed in claim 1,
wherein the number of oxyethylene units bonded to one another in the polyoxyethylene radicals is 5 to 5,000.

5. The process as claimed in claim 1,
wherein that proportion in the graft copolymer which is present in addition to the polyoxyethylene radicals comprises up to 30% by weight of other monomer units selected from the group consisting of acrylate, vinyl chloride and ethylene units.

6. The process as claimed in claim 1,
wherein the aliphatic aldehyde used is n-butyraldehyde.

7. The process as claimed in claim 1, wherein the aliphatic aldehyde having at least 3 carbon atoms is in admixture with up to an equal weight of aldehyde different therefrom.

8. The process as claimed in claim 1,
wherein the acidic catalyst is a mineral acid and an emulsifying sulfonic acid.

9. The process as claimed in claim 1, wherein the acidic catalyst used is 0.4 to 1% by weight, based on the aqueous phase, of a mixture of phosphoric acid and ($C_8$–$C_{18}$)-alkylsulfonic acid.

10. The process as claimed in claim 1,
wherein the reaction mixture has added to it a flow-control agent, a solvent and/or a plasticizer for the resulting polyvinyl acetal polymer.

11. The process as claimed in claim 1, wherein the reaction is carried out in the presence of inert pigment and/or filler.

12. A finely divided polyvinyl acetal which is prepared in the form of an aqueous suspension or, if desired, in powder form from polyvinyl alcohol and at least one aliphatic aldehyde having at least 3 carbon atoms, and which contains 0.1 to 10% by weight, based on polyvinyl acetal, of a completely or partially hydrolyzed vinyl ester copolymer grafted onto polyethylene oxide or a polyethylene oxide derivative and acetalized in the mixture with the polyvinyl alcohol.

13. A finely divided polyvinyl acetal as claimed in claim 12, whose average particle size is between 0.5 and 10 μm.

14. A finely divided polyvinyl acetal as claimed in claim 12, which contains n-butyraldehyde as the aliphatic aldehyde.

15. A finely divided polyvinyl acetal as claimed in claim 12, which contains the acetalization product of a completely or partially hydrolyzed graft copolymer of vinyl acetate on polyethylene oxide or a polyethylene oxide derivative.

16. A finely divided polyvinyl acetal as claimed in claim 12, which is in the form of an aqueous, low-electrolyte or electrolyte-free suspension which contains 40 to 60% by weight of acetal polymer.

17. A finely divided polyvinyl acetal as claimed in claim 12, which contains flow-control agent and/or solvent and/or plasticizer and/or pigment and/or filler, where in the case of a suspension the total solids content is 5 to 70% by weight, based on the total aqueous, low-electrolyte or electrolyte-free suspension.

18. Use of finely divided polyvinyl acetal as claimed in claim 12, in particular from a low-electrolyte or electrolyte-free aqueous suspension, for baked coatings on any coatable base or substrate, preferably on wood, glass, building material, textile and, in particular, on metal.

19. Finely-divided polyvinyl acetal which is an acid-catalyzed (polyvinyl alcohol)/(aliphatic aldehyde)/(hydrolyzed graft copolymer of vinyl ester on polyethylene oxide or polyethylene oxide derivative) aqueous acetalization reaction product having an average particle size of between 0.5 and 10 μm, the hydrolyzed graft copolymer comprising from 0.1 to 10% by weight, based on the polyvinyl alcohol, and at least 50% of the aliphatic aldehyde having at least 3 carbon atoms.

20. A process which comprises coating a coatable base or substrate with an aqueous suspension of finely-divided polyvinyl acetal of claim 19, drying the resulting coating to form a crack-free white layer and baking the layer at a temperature of from 90° to 200° C. to obtain a smooth, nonporous, firmly-adherent and water-resistant coating on the coatable base or substrate.

* * * * *